US008113791B2

(12) United States Patent
Park et al.

(10) Patent No.: US 8,113,791 B2
(45) Date of Patent: Feb. 14, 2012

(54) INTEGRATED HYDROGEN RECIRCULATION BLOWER FOR FUEL CELL VEHICLE

(75) Inventors: Moon Soo Park, Gyeonggi-do (KR); Young Hoon Kim, Seoul (KR); Shin Hyoung Kang, Seoul (KR)

(73) Assignees: Hyundai Motor Company, Seoul (KR); Seoul National University Industry Foundation, Seoul (KR)

( * ) Notice: Subject to any disclaimer, the term of this patent is extended or adjusted under 35 U.S.C. 154(b) by 782 days.

(21) Appl. No.: 12/214,648

(22) Filed: Jun. 20, 2008

(65) Prior Publication Data

US 2009/0155102 A1   Jun. 18, 2009

(30) Foreign Application Priority Data

Dec. 12, 2007   (KR) .................. 10-2007-0129202

(51) Int. Cl.
  *F04B 23/08*  (2006.01)
  *H01M 8/04*  (2006.01)
(52) U.S. Cl. .......... 417/83; 417/89; 417/423.1; 429/415
(58) Field of Classification Search ............ 417/78, 417/80, 83, 87, 89, 423.1, 423.14, 168, 172, 417/197; 429/400, 411, 446, 457, 415
  See application file for complete search history.

(56) References Cited

U.S. PATENT DOCUMENTS

| | | | | |
|---|---|---|---|---|
| 2,203,077 A * | 6/1940 | Carpenter | ................ | 417/83 |
| 2,478,941 A * | 8/1949 | Piccardo | ................ | 417/81 |
| 3,185,101 A * | 5/1965 | Brooks et al. | ................ | 415/176 |
| 3,918,262 A * | 11/1975 | Postma | ................ | 60/517 |
| 4,627,792 A * | 12/1986 | Jensen et al. | ................ | 417/83 |
| 4,823,550 A * | 4/1989 | Decker | ................ | 60/412 |
| 5,088,896 A * | 2/1992 | Nielsen et al. | ................ | 417/178 |
| 5,697,769 A * | 12/1997 | Kobman et al. | ................ | 417/410.1 |
| 6,547,532 B2 * | 4/2003 | Gonzalez et al. | ................ | 417/197 |
| 7,943,260 B2 * | 5/2011 | Brighton et al. | ................ | 429/415 |
| 2002/0163263 A1 * | 11/2002 | Uffelman | ................ | 310/71 |
| 2003/0096145 A1 * | 5/2003 | Sugawara et al. | ................ | 429/22 |
| 2003/0148167 A1 * | 8/2003 | Sugawara et al. | ................ | 429/34 |
| 2004/0023084 A1 * | 2/2004 | Sterchi et al. | ................ | 429/13 |
| 2005/0208357 A1 | 9/2005 | Bitzer et al. | | |
| 2006/0251935 A1 * | 11/2006 | Barrett et al. | ................ | 429/22 |

FOREIGN PATENT DOCUMENTS

| | | |
|---|---|---|
| JP | 07-029587 | 1/1995 |
| JP | 08-022831 | 1/1996 |
| JP | 08-329967 | 12/1996 |
| JP | 2004-281330 | 10/2004 |
| KR | 100765269 | 10/2007 |

* cited by examiner

*Primary Examiner* — Devon C Kramer
*Assistant Examiner* — Nathan Zollinger
(74) *Attorney, Agent, or Firm* — Edwards Wildman Palmer LLP; Peter F. Corless

(57) ABSTRACT

A hydrogen recirculation blower for a fuel cell vehicle includes an ejector integrated with a housing of the blower. An integrated hydrogen recirculation blower for a fuel cell vehicle includes: a blower housing including an inlet and an outlet formed on a top surface thereof; an impeller rotatably installed inside the blower housing; a motor connected to a rear end of the impeller to rotate the impeller; and an ejector formed integrally on a upper surface of the blower housing.

8 Claims, 10 Drawing Sheets

INTEGRATED HYDROGEN RECIRCULATION BLOWER FOR FUEL CELL VEHICLE

CROSS-REFERENCE TO RELATED APPLICATION

This application claims under 35 U.S.C. §119(a) the benefit of Korean Patent Application No. 10-2007-0129202 filed Dec. 12, 2007, the entire contents of which are incorporated herein by reference.

BACKGROUND (a) Technical Field

The present invention relates to an hydrogen recirculation blower for a fuel cell vehicle, in which an ejector is integrated.

(b) Background Art

A fuel cell for a fuel cell vehicle as a power source is configured to generate electricity by reacting oxygen in air and hydrogen as fuel.

The fuel cell includes a separator, an anode, an electrolyte membrane, a cathode, a hydrogen/air/coolant circulating system, an anode flow field, a cathode flow field, and a coolant flow field.

For startup of the fuel cell, hydrogen as fuel is supplied from a hydrogen tank to the anode flow field via a hydrogen supply solenoid valve and a pipe.

To increase fuel efficiency, hydrogen remaining unreacted in the fuel cell is recirculated. In particular, when a hydrogen recirculation system is operated in a state where a purge valve is being closed, the unreacted hydrogen in the fuel cell moves along the pipe and enters the anode flow field via the hydrogen recirculation system and a hydrogen recirculation shut-off valve.

As shown in FIGS. 1 and 2, conventional hydrogen recirculation systems for the fuel cell use either an ejector 101 or a blower 102.

For the ejector-only system, while its power consumption and price are low, it has drawbacks in that, if the amount of hydrogen fuel used in the fuel cell stack decreases, the performance is deteriorated. That is, it cannot guarantee the performance in a wide operation range of a vehicle.

For the blower-only system, on the contrary, while it can provide a desired performance in a wide operation range of a vehicle, its power consumption and price are higher than the ejector-only system.

The information disclosed in this Background section is only for enhancement of the understanding of the background of the invention and should not be taken as an acknowledgement or any form of suggestion that this information forms the prior art that is already known to a person skilled in the art.

SUMMARY OF THE DISCLOSURE

The present invention has been made in an effort to solve the above-described problems associated with prior art. The present invention is directed to an integrated hydrogen recirculation blower for a fuel cell vehicle, in which an ejector is incorporated into a blower housing. With such an arrangement, the integrated hydrogen recirculation blower can be operated in an adjustable manner depending on the vehicle output power required. Specifically, both the blower and the ejector may be operated when a high power is required, while only the blower is operated when a low power is required, thus reducing the power consumption of the blower.

In one aspect, the present invention provides an integrated hydrogen recirculation blower for a fuel cell vehicle, the integrated hydrogen recirculation blower comprising: a blower housing including an inlet and an outlet formed on a top surface thereof; an impeller rotatably installed inside the blower housing; a motor connected to a rear end of the impeller to rotate the impeller; and an ejector formed integrally on a upper surface of the blower housing.

In the illustrative embodiment, the inlet may include a plurality of inlets. Preferably, it includes a first inlet through which new hydrogen is introduced from a hydrogen tank and a second inlet through which recirculated hydrogen is introduced from a stack outlet. Suitably, the first and second inlets may be in parallel to each other.

The blower housing may comprise an upper housing and a lower housing, in which the first and second inlets and the outlet are formed on an upper surface of the upper housing. Preferably, the first and second inlets and the outlet may be formed in parallel to each other.

The upper housing may include a substantially semicircular groove which is formed in the circumferential direction on the inside edge of the upper housing. One end of the groove is preferably in fluid communication with the second inlet and the other end of the groove preferably is in fluid communication with the outlet. The recirculated hydrogen introduced through the second inlet may move along the semicircular groove and eventually be discharged through the outlet.

The ejector may include a large diameter portion extending upwardly from the upper surface of the blower housing and a small diameter portion extending from an end of the large diameter portion with a relatively small diameter. The large diameter portion may be furnished with a first connecting passage extending from the bottom at the center thereof, which is in communication with the first inlet, and a second connecting passage formed on the outside of the first connecting passage, which is in communication with the second inlet. The small diameter portion may comprise an ejector outlet formed inside thereof, which is connected to the first connecting passage and the second connecting passage at an end of the large diameter portion where the first connecting passage and the second connecting passage are converged together. Suitably, a check valve is provided in a connecting line connecting the second inlet and the second connecting passage.

At a low output power, the check valve shuts off the second inlet and the second connecting passage to prevent the recirculated hydrogen from being introduced to the ejector so that the recirculated hydrogen is introduced through the second inlet, moved along the semicircular groove, and discharged through the outlet, and the new hydrogen is introduced through the first inlet and discharged through the first connecting passage and the ejector outlet.

On the other hand, at a high output power, the check valve connects the second inlet and the second connecting passage so that the recirculated hydrogen is discharged through the second connecting passage and the ejector outlet and, at the same time, introduced through the second inlet, moved along the semicircular groove, and discharged through the outlet, and the new hydrogen is introduced through the first inlet and discharged through the first connecting passage and the ejector outlet.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like.

The above features and advantages of the present invention will be apparent from or are set forth in more detail in the accompanying drawings, which are incorporated in and form a part of this specification, and the following Detailed Description, which together serve to explain by way of example the principles of the present invention.

BRIEF DESCRIPTION OF THE DRAWINGS

The above and other features of the present invention will now be described in detail with reference to certain exemplary embodiments thereof illustrated the accompanying drawings which are given hereinafter by way of illustration only, and thus are not limitative of the present invention, and wherein.

Figure 1:
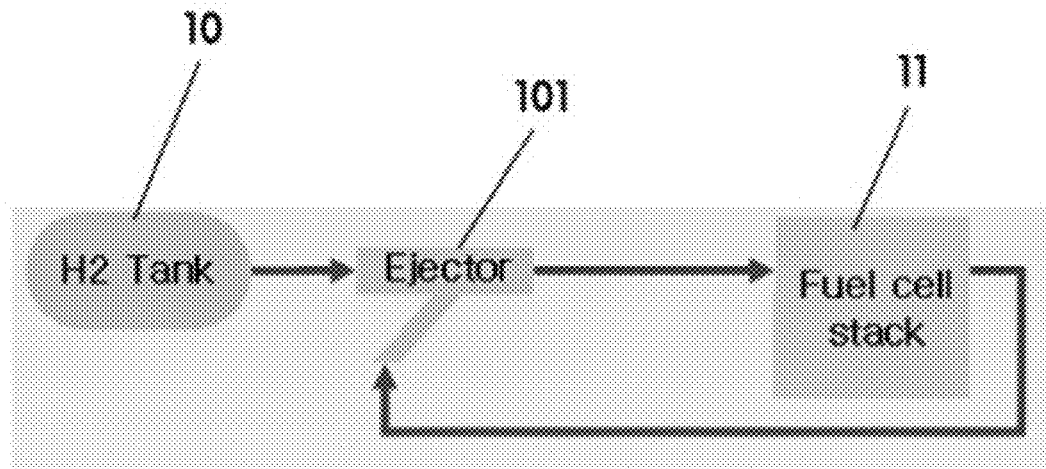
FIG. 1 is a schematic diagram showing a conventional ejector type hydrogen recirculation system.
Figure 2:
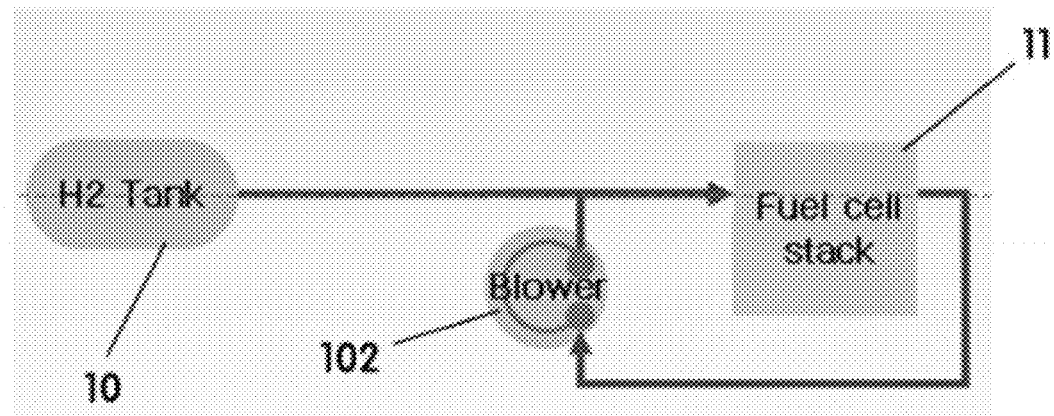
FIG. 2 is a schematic diagram showing a conventional blower type hydrogen recirculation system.

Reference numerals set forth in the Drawings includes reference to the following elements as further discussed below:

| | |
|---|---|
| 10: | hydrogen tank |
| 11: | fuel cell |
| 12: | ejector |
| 13: | ejector outlet |
| 14: | blower housing |
| 14a: | upper housing |
| 14b: | lower housing |
| 15: | impeller |
| 16: | motor |
| 17: | first inlet |
| 18: | second inlet |
| 19: | outlet |
| 20: | hydrogen connecting passage |
| 21: | recirculated hydrogen connecting passage |
| 22: | semicircular groove |
| 23: | semicircular plate |
| 24: | connecting line |
| 25, 26: | check valves |

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to the preferred embodiments of the present invention, examples of which are illustrated in the drawings attached hereinafter, wherein like reference numerals refer to like elements throughout. The embodiments are described below so as to explain the present invention by referring to the figures.

Figure 3:
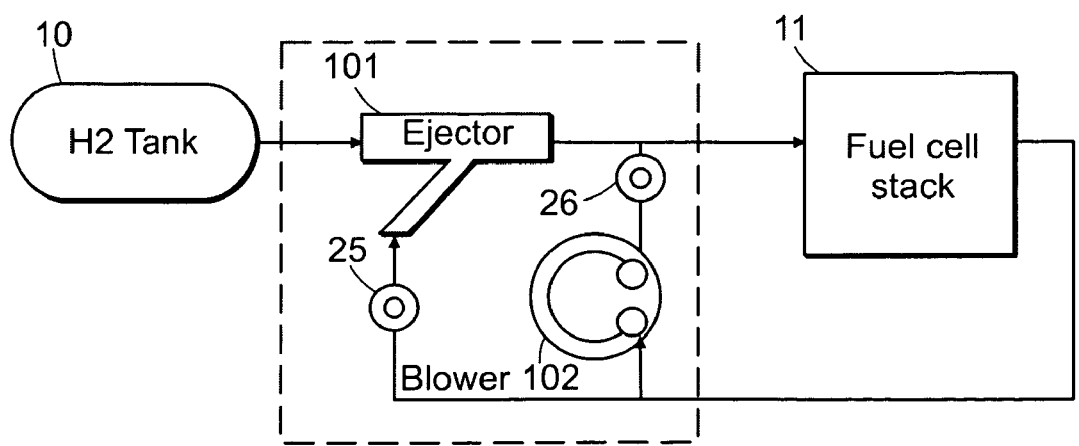
FIG. 3 is a schematic diagram illustrating an integrated hydrogen recirculation system according to a preferred embodiment of the present invention.
Figure 4:
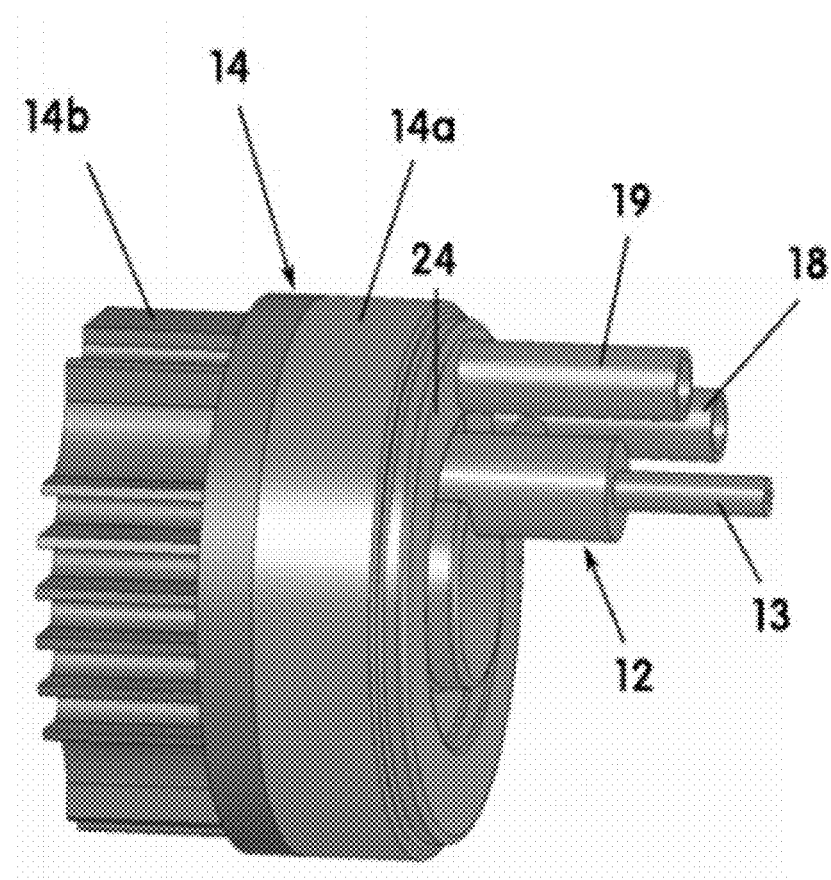
FIG. 4 is an perspective view showing an external structure of an integrated hydrogen recirculation blower in accordance with a preferred embodiment of the present invention.
Figure 5:
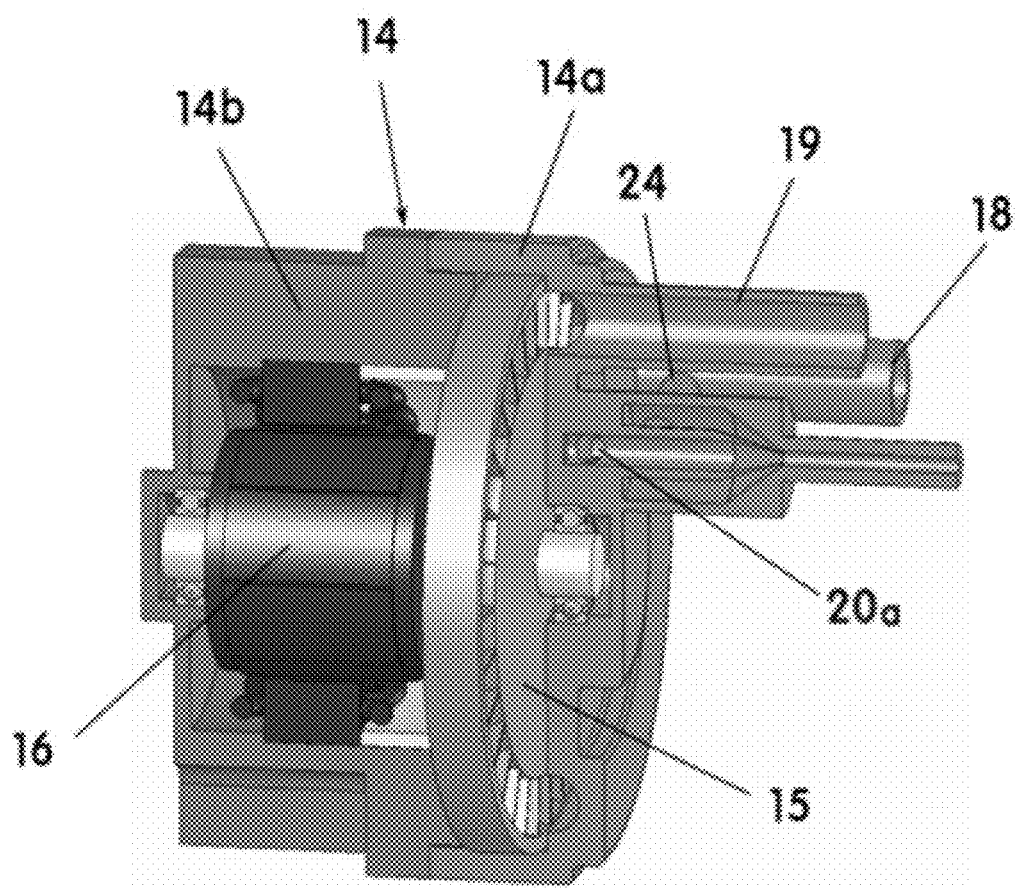
FIG. 5 is an exploded perspective view showing an internal structure of the integrated hydrogen recirculation blower of FIG. 4.
Figure 6:
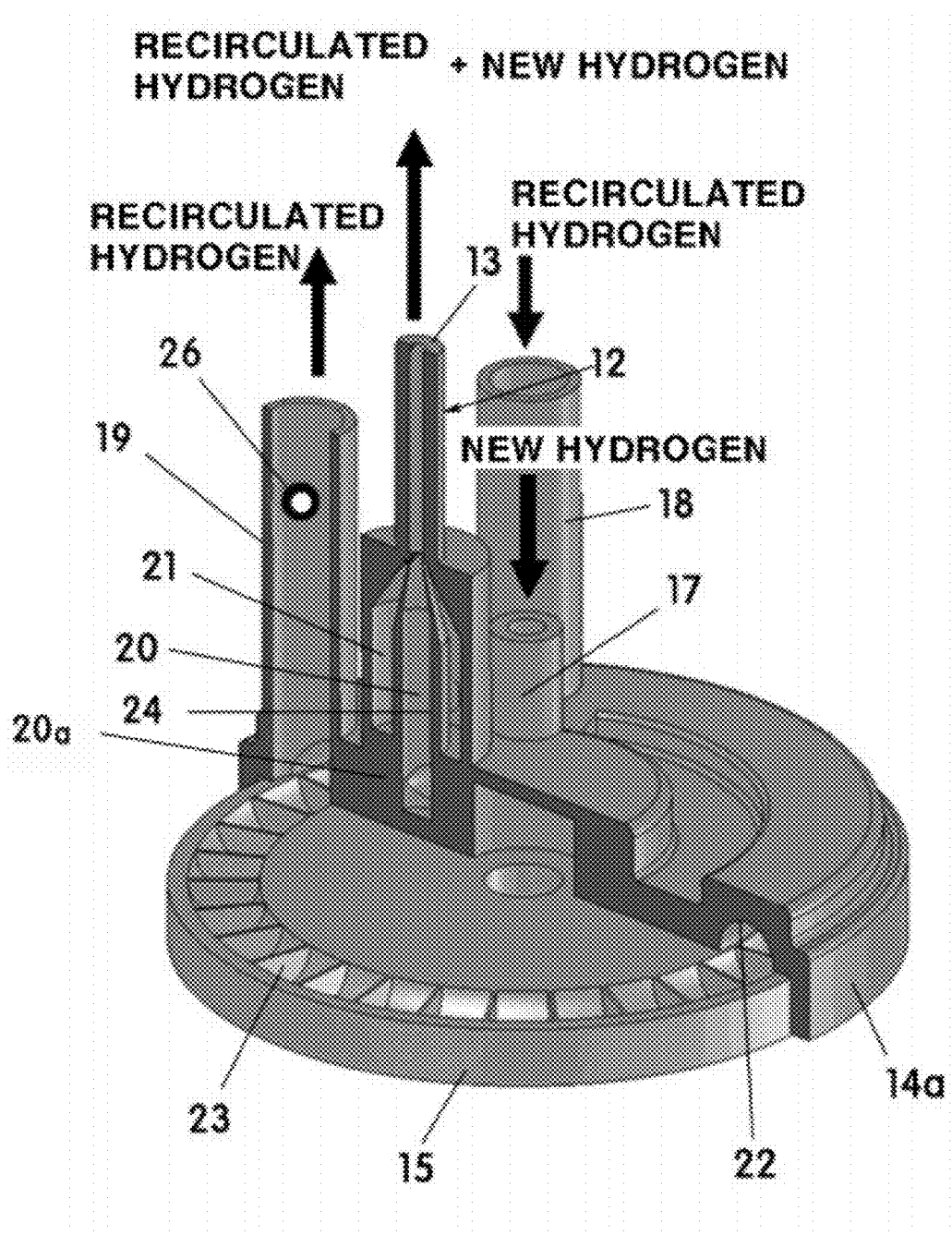
FIG. 6 is another exploded perspective view showing an internal structure of the integrated hydrogen recirculation blower of FIG. 4.
Figure 7:
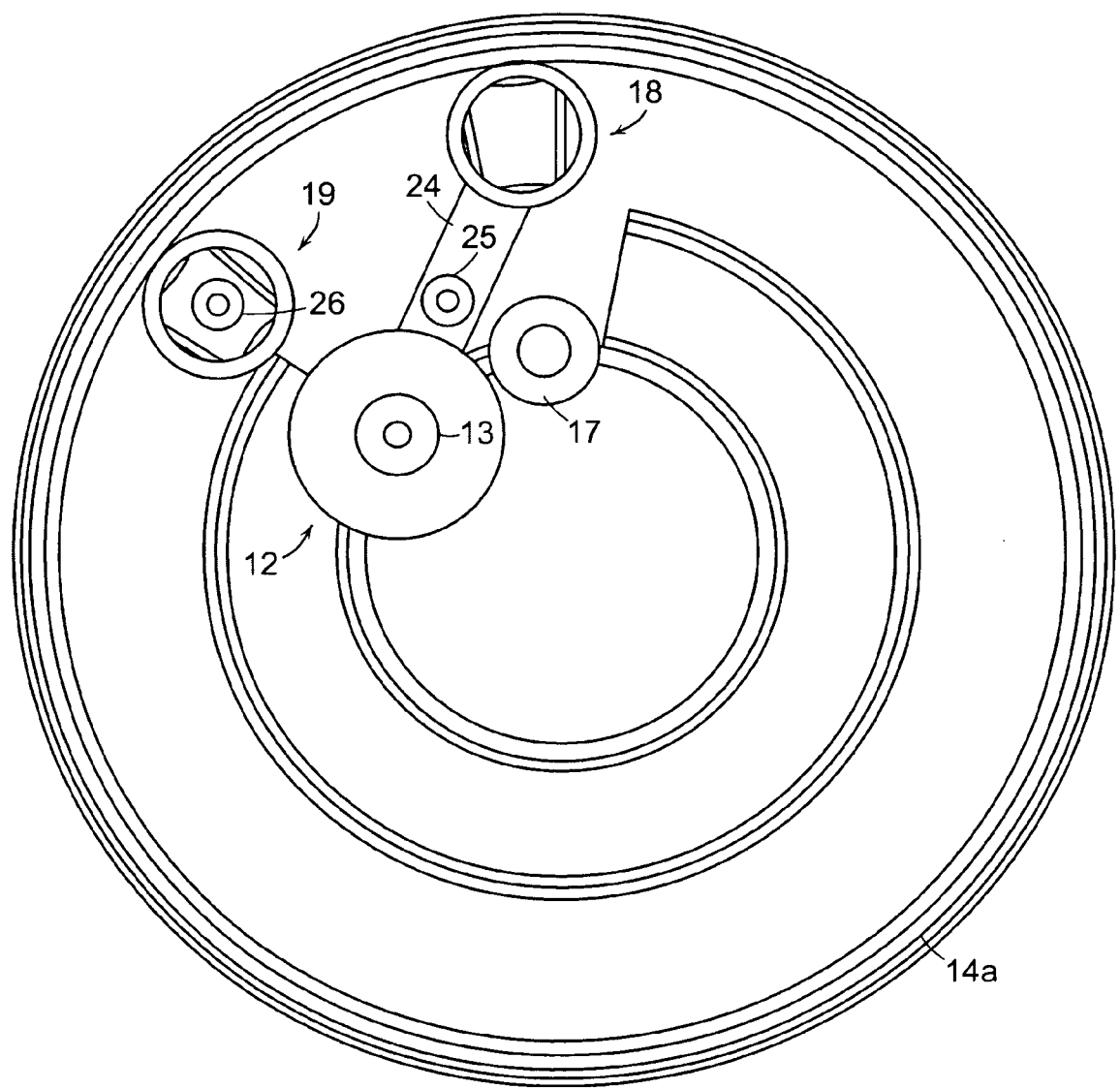
FIG. 7 is a plan view of the integrated hydrogen recirculation blower of FIG. 4.
Figure 8:
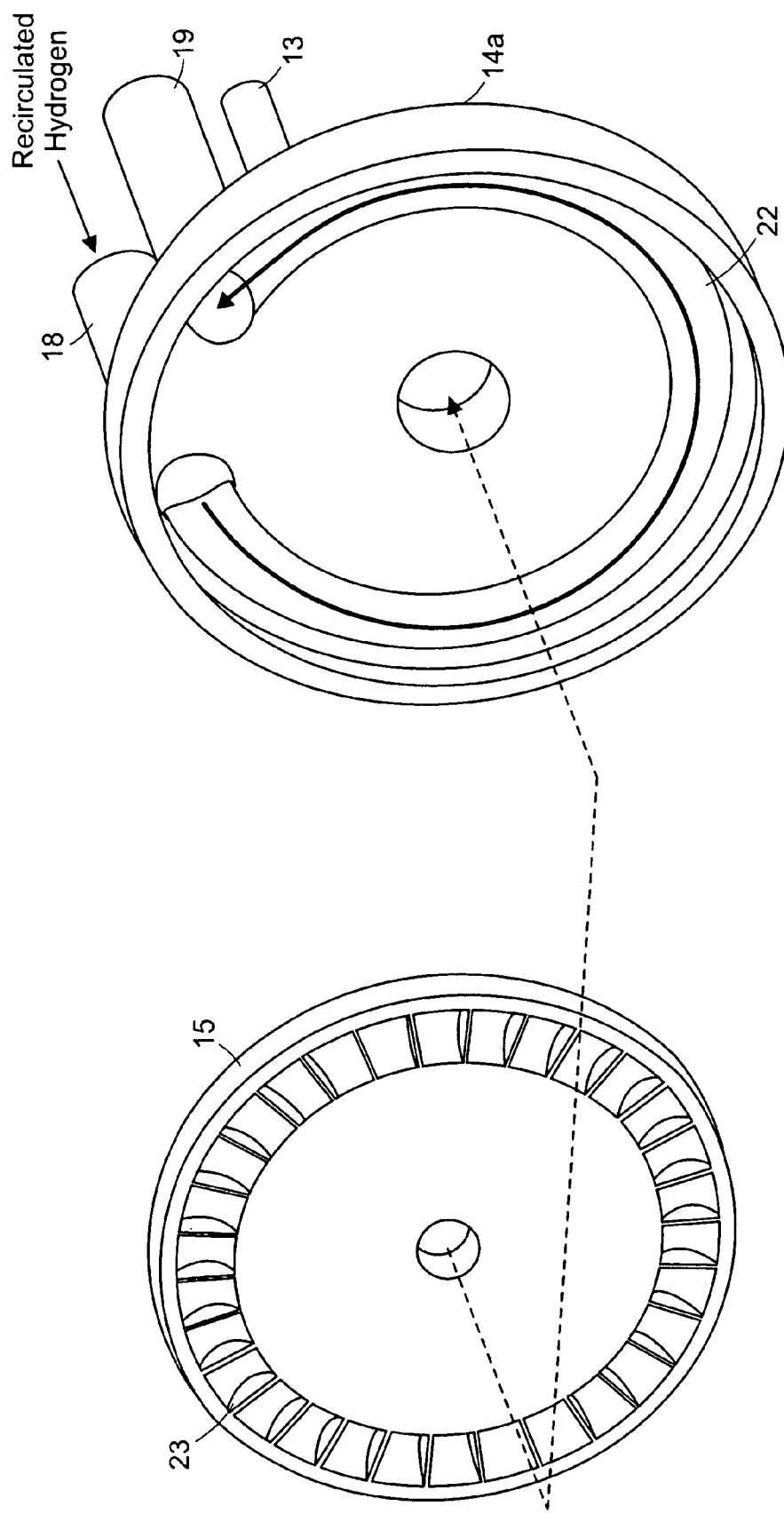
FIG. 8 is an exploded view showing the impeller and the inside of the upper housing of FIG. 5.

FIG. 3 is a schematic diagram illustrating an integrated hydrogen recirculation system according to a preferred embodiment of the present invention, FIG. 4 is an perspective view showing an external structure of the integrated hydrogen recirculation blower, FIG. 5 is an exploded perspective view showing an internal structure of the integrated hydrogen recirculation blower of FIG. 4, FIG. 6 is another exploded perspective view showing an internal structure of the integrated hydrogen recirculation blower of FIG. 4, FIG. 7 is a plan view of the integrated hydrogen recirculation blower of FIG. 4, and FIG. 8 is an exploded view showing the impeller and the inside of the upper housing of FIG. 5.

The present invention aims at integrating an ejector 12 with a blower housing 14 to utilize advantages of the blower and the ejector 12, thus ensuring the performance in a wide operation range and reducing the power consumption.

An integrated hydrogen recirculation blower in accordance with a preferred embodiment of the present invention includes the blower housing 14 having blower inlet and outlet, the ejector 12 integrated with the blower housing 14, an impeller 15 and a motor 16 provided inside the blower housing 14.

Preferably, the overall shape of the blower housing 14 is a cylinder. The blower housing 14 includes an upper housing 14a and a lower housing 14b. A first inlet 17, a second inlet 18, an outlet 19, and an ejector outlet 13 are provided on the outer surface of the upper housing 14a. New hydrogen and/or recirculated hydrogen is introduced through the inlets 17 and/or 18 and discharged through the outlet 19 and/or the ejector outlet 13. The fluid has a flow direction of "U", in which the fluid is introduced in one direction and discharged in the other direction.

Hydrogen is newly supplied from a hydrogen tank 10 through the first inlet 17. Hydrogen is recirculated from a stack outlet through the second inlet 18.

The ejector 12 includes a large diameter portion and a small diameter portion. A hydrogen connecting passage 20 extending from the bottom of the center to the outlet direction to be connected to the first inlet 17 is provided inside the large diameter portion such that the new hydrogen is introduced through the hydrogen connecting passage 20. Moreover, a recirculated hydrogen connecting passage 21 is provided on the outside of the hydrogen connecting passage 20 to be connected to the second inlet 18, separately from the hydrogen connecting passage 20, such that the recirculated hydrogen is introduced through the recirculated hydrogen connecting passage 21.

The small diameter portion extends from an end of the large diameter portion with a relatively small diameter so that the hydrogen connecting passage 20 of the large diameter portion and an end of the recirculated hydrogen connecting passage 21 are joined with each other. Accordingly, the new hydrogen and the recirculated hydrogen can be mixed and discharged through the ejector outlet 13.

The impeller 15 has a circular plate shape and is provided so as to face the inside of the upper housing 14a. A first semicircular groove is formed along the edge of the circular plate, and a plurality of semicircular plates 23 are formed in the circumferential direction at regular intervals in the first semicircular groove.

A second semicircular groove 22 is provided in the circumferential direction on the inside edge of the upper housing 14a so that one end thereof is connected to the second inlet 18 and the other end is connected to the outlet 19.

The first semicircular groove of the impeller 15 and the second semicircular grove 22 formed inside the upper housing 14a are faced with each other to facilitate the flow of the fluid and, especially, the flow of the recirculated hydrogen is facilitated by the rotation of the semicircular plates 23 of the impeller 15.

The motor 16 is connected to a rear end of the impeller 15 and thus the impeller 15 is rotated by the operation of the motor 16. Moreover, the rotational speed and the operation of the motor 16 are controlled by a control signal from a controller.

The operation state of the integrated hydrogen recirculation blower with the above described configuration will be described below.

Figure 9:
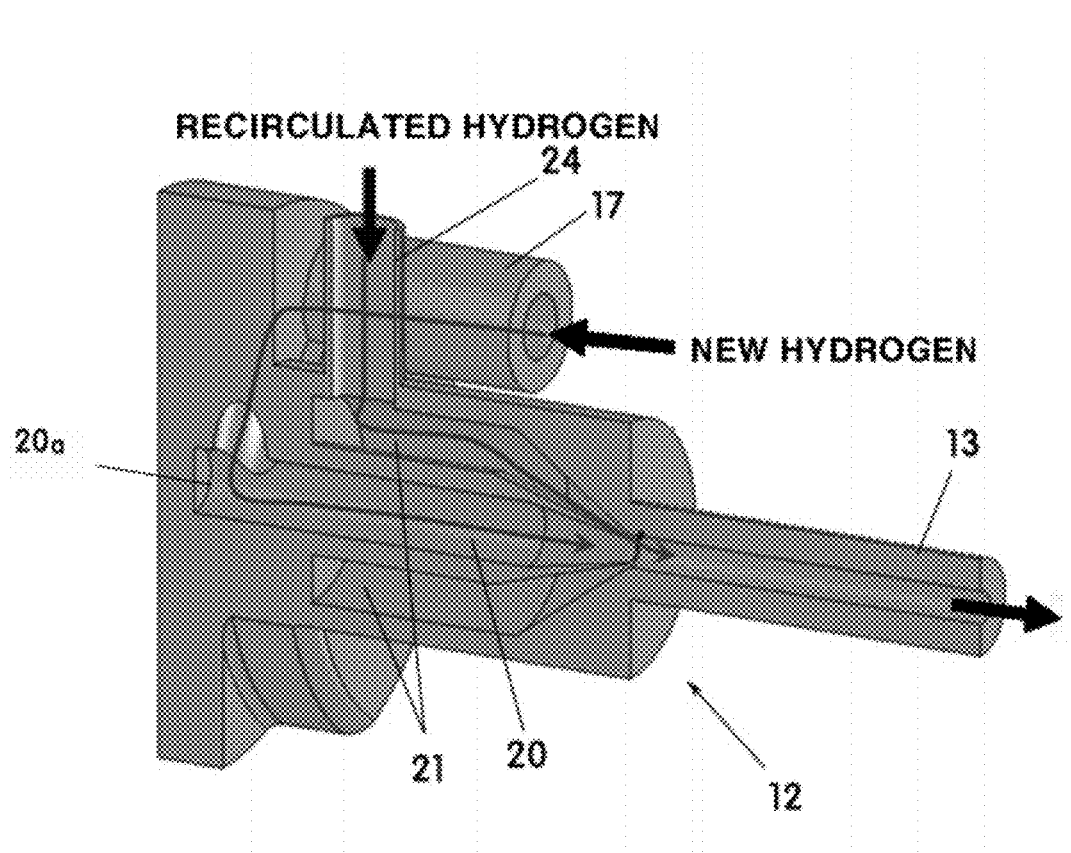
FIG. 9 is a view showing an operation state in which recirculated hydrogen flows in the upper housing of FIG. 5 at a high output power.

FIG. 9 is a view showing an operation state in which recirculated hydrogen flows in the upper housing of FIG. 5 at a high output power.

First, the controller receives signals from a vehicle speed sensor and a pedal sensor and controls the operation of the integrated hydrogen recirculation blower to adjust the amount of hydrogen supplied to the fuel cell 11 according to the vehicle output power.

In this case, the recirculated hydrogen connecting passage 21 of the ejector 12 is shut off by the a check valve 25 provided in a connecting line 24 connecting the second inlet 18 and the recirculated hydrogen connecting passage 21, thus preventing the recirculated hydrogen from being introduced to the ejector 12.

The controller operates the blower, which can provide a desired performance in a wide operation region, at a low output power. In particular, the motor 16 of the blower is operated to rotate the impeller 15 such that the new hydrogen is introduced through the first inlet 17 and discharged to the ejector outlet 13 through the hydrogen connecting passage 20 via portion 20a of the ejector 12 and the recirculated hydrogen is introduced through the second inlet 18 and discharged to the outlet 19 of the blower through the semicircular groove 22 formed inside the upper housing 14a.

Less amount of hydrogen supplied to the fuel cell 11 is required at the low output power than that at the high output power. Thus, at the low output power, the recirculated hydrogen can be prevented from being introduced to the ejector and recirculated hydrogen can be supplemented by the operation of the blower.

Meanwhile, the recirculated hydrogen is introduced through both the blower and the ejector 12 at the high output power. In particular, the motor 16 of the blower is operated to rotate the impeller 15 such that the new hydrogen is introduced through the first inlet 17 and discharged to the ejector outlet 13 through the hydrogen connecting passage 20 of the ejector 12 and the recirculated hydrogen is introduced through the second inlet 18 and discharged to the ejector output 13 through the recirculated hydrogen connecting passage 21 of the ejector 12.

Moreover, the recirculated hydrogen is introduced through the second inlet 18 by the operation of the blower and discharged to the blower outlet 19 through the semicircular groove 22 formed inside the upper housing 14a.

In this case, it is possible to reduce the rotational speed of the blower and supplement the recirculated hydrogen at the high output power by the operation of the ejector 12, compared with the conventional hydrogen recirculation system using only the blower.

In the integrated hydrogen recirculation blower, the ejector 12 can be operated in a dual mode, and thus it is possible to reduce overall power consumption.

Figure 10:
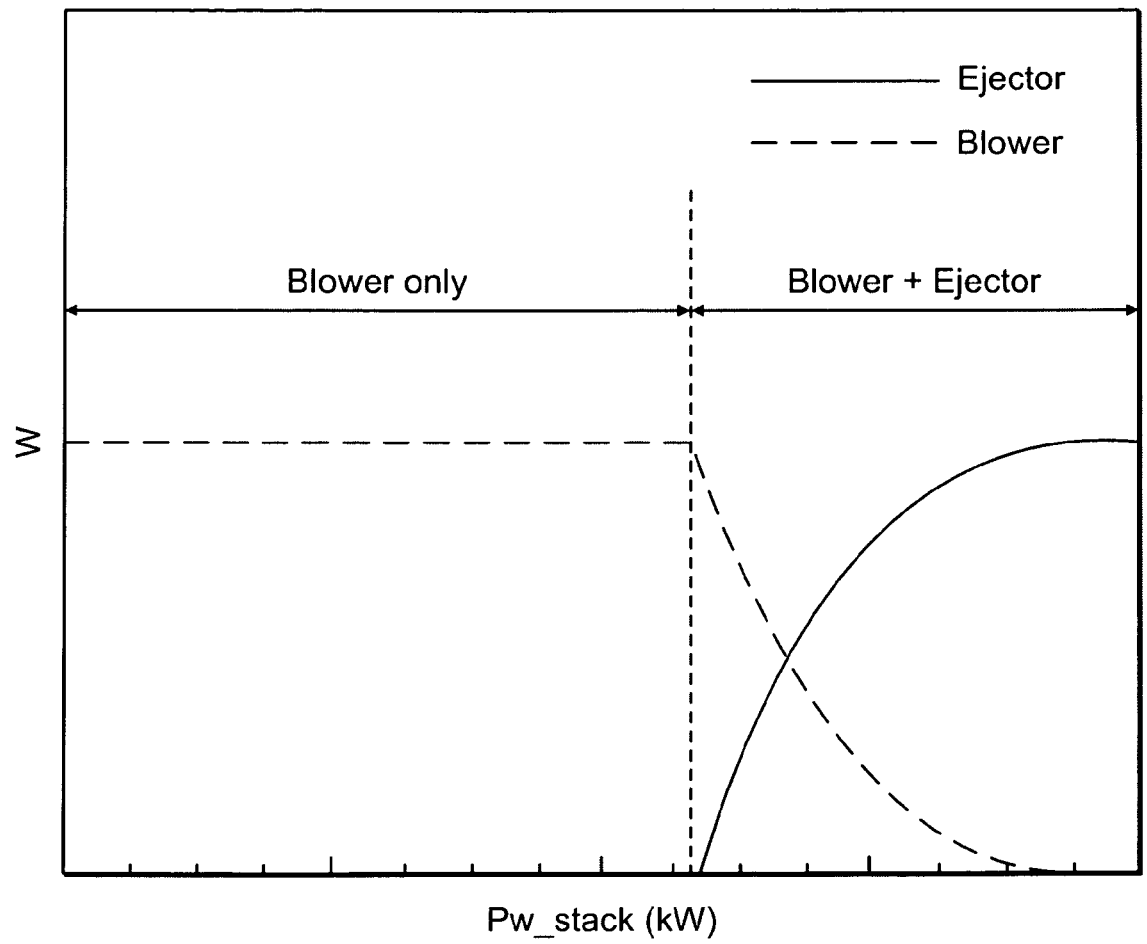
FIG. 10 is a graph showing a change in recirculation rate according to vehicle output power.
Figure 11:
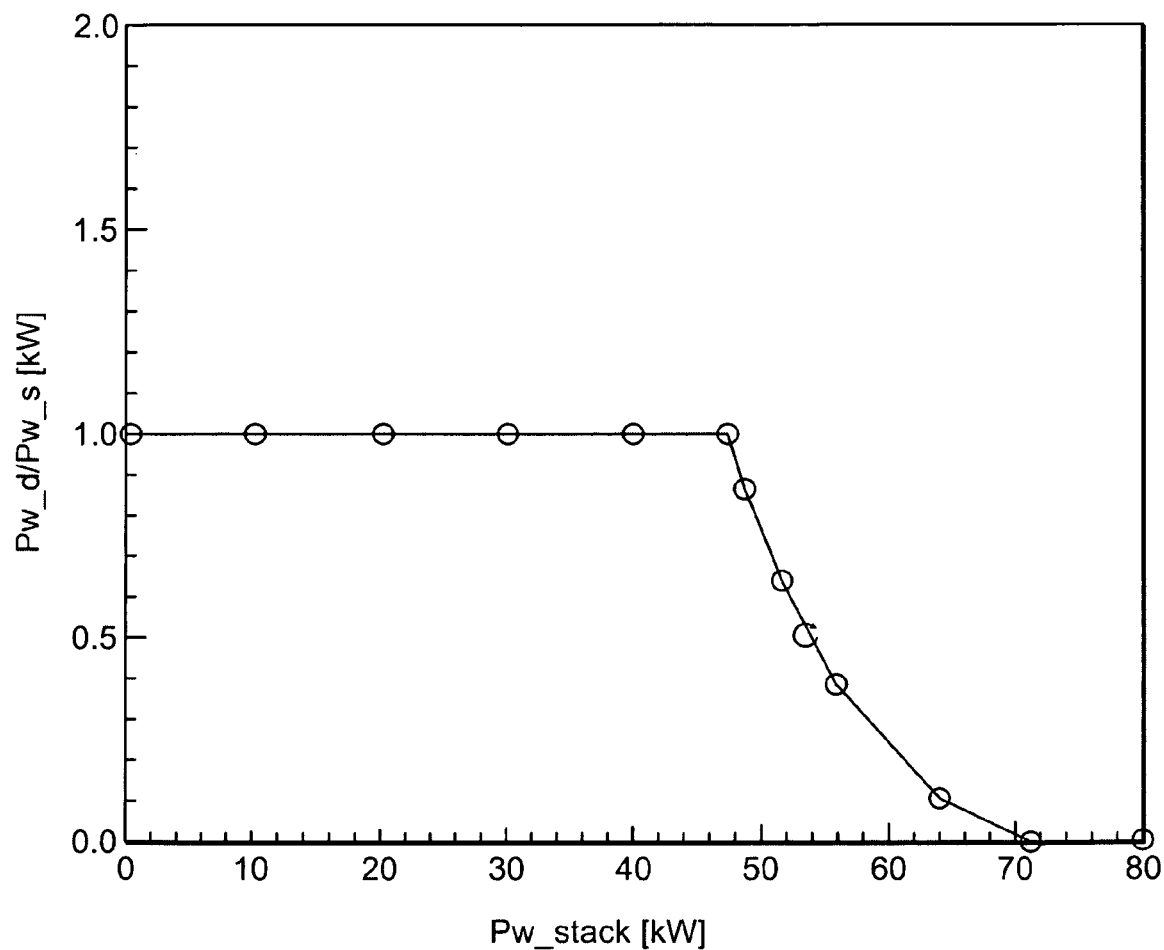
FIG. 11 is a graph showing a power reduction effect according to vehicle output power.

FIG. 10 is a graph showing a change in recirculation rate according to the vehicle output power, and FIG. 11 is a graph showing a power reduction effect according to the vehicle output power.

It can be ascertained that the power consumption of the blower is reduced to 50% if the vehicle is driven with an output power of 52 kW as shown in FIG. 11.

As described above, according to the integrated hydrogen recirculation blower for the fuel cell vehicle of the present invention, the ejector is integrated with the blower housing to utilize the advantage of the blower capable of maintaining a desired performance in a wide operation region and the advantage of the ejector having a low power consumption such that only the blower is operated at a low output and the blower and the ejector are simultaneously operated at a high output, thus reducing the power.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. An integrated hydrogen recirculation blower for a fuel cell vehicle, the integrated hydrogen recirculation blower comprising:
   a blower having a blower housing including an inlet and an outlet formed on a top surface thereof, wherein the inlet includes a first inlet through which new hydrogen is introduced from a hydrogen tank and a second inlet through which recirculated hydrogen is introduced from a stack outlet, wherein the first and second inlets are in parallel to each other;
   an impeller rotatably installed inside the blower housing;
   a motor connected to a rear end of the impeller to rotate the impeller;
   an ejector formed integrally on and extending from the top surface of the blower housing; and
   a controller configured to operate the motor in an adjustable manner depending on a level of power output required by the fuel cell vehicle.

2. The integrated hydrogen recirculation blower of claim 1, wherein the blower housing comprises an upper housing and a lower housing, in which the first and second inlets and the outlet are formed on the upper housing.

3. The integrated hydrogen recirculation blower of claim 2, wherein the first and second inlets and the outlet are formed in parallel to each other.

4. The integrated hydrogen recirculation blower of claim 3, wherein the upper housing includes a substantially semicircular groove which is formed in the circumferential direction on an inside edge of the upper housing, one end of the groove being in fluid communication with the second inlet whilst the other end of the groove is in fluid communication with the outlet, whereby the recirculated hydrogen introduced through the second inlet moves along the groove and eventually is discharged through the outlet.

5. The integrated hydrogen recirculation blower of claim 4, wherein the ejector includes a large diameter portion including a first end extending upwardly from the top surface of the blower housing and a small diameter portion extending from a second end of the large diameter portion,
  wherein the large diameter portion is furnished with a first connecting passage extending from a bottom at a center of the large diameter portion, which is in communication with the first inlet, and a second connecting passage formed on the outside of the first connecting passage, which is in communication with the second inlet,
  wherein the small diameter portion comprises an ejector outlet formed within the small diameter portion, which ejector outlet is connected to the first connecting passage and the second connecting passage at the second end of the large diameter portion where the first connecting passage and the second connecting passage are converged together, and
  wherein a check valve is provided in a connecting line connecting the second inlet and the second connecting passage.

6. The integrated hydrogen recirculation blower of claim 5, wherein at a low output power, the check valve shuts off the second inlet and the second connecting passage to prevent the recirculated hydrogen from being introduced to the ejector so that the recirculated hydrogen is introduced through the second inlet, moved along the semicircular groove, and discharged through the outlet, and the new hydrogen is introduced through the first inlet and discharged through the first connecting passage and the ejector outlet.

7. The integrated hydrogen recirculation blower of claim 5, wherein at a high output power, the check valve connects the second inlet and the second connecting passage so that the recirculated hydrogen is discharged through the second connecting passage and the ejector outlet and, at the same time, introduced through the second inlet, moved along the semicircular groove, and discharged through the outlet, and the new hydrogen is introduced through the first inlet and discharged through the first connecting passage and the ejector outlet.

8. An integrated hydrogen recirculation blower for a fuel cell vehicle, the integrated hydrogen recirculation blower comprising:
  a blower having a blower housing including an inlet and an outlet formed on a top surface thereof;
  an impeller rotatably installed inside the blower housing;
  a motor connected to a rear end of the impeller to rotate the blower housing;
  an ejector formed integrally on the top surface of the blower housing wherein the integrated hydrogen recirculation blower is configured so that both the blower and the ejector are operated when a first level of power is required, while only the blower is operated when a second level of power is required.

* * * * *